Feb. 19, 1963  R. L. PRICE ETAL  3,078,006
CARBON-CONTAINING SILICONE RESIN COATED METALLIC BAKE FORM
Filed Aug. 6, 1957
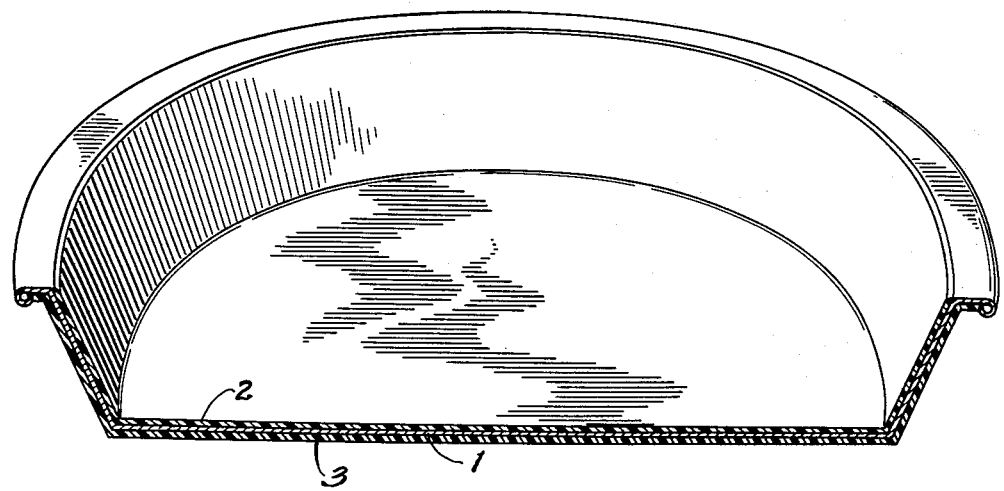
INVENTORS:
Kenneth Peer
and Robert L. Price,
BY Louis Bernat.
ATTORNEYS.

United States Patent Office 3,078,006
Patented Feb. 19, 1963

3,078,006
CARBON-CONTAINING SILICONE RESIN COATED METALLIC BAKE FORM
Robert L. Price, Harvey, and Kenneth C. Peer, Highland Park, Ill., assignors, by mesne assignments, to Ekco Products Company, Chicago, Ill., a corporation of Delaware
Filed Aug. 6, 1957, Ser. No. 676,520
8 Claims. (Cl. 220—64)

This invention relates to carbon-containing polyorganosiloxane and polyorganosilane resin coating compositions which are characterized by high heat absorption. They are particularly useful in coating bake pans to facilitate the release of food products baked therein without the use of grease-like materials, and furthermore to provide the pans with improved radiant heat absorption characteristics so that the food products are properly and efficiently baked.

The usefulness of silicone release resins as coating films for bake pans has been recognized for some time. A thin coating of silicone resin on the surface of an aluminum, aluminized steel, steel or tinplate pan permits baking bread or other baked goods without the necessity of greasing the pan. The products after baking, are released from the pan with commercial ease. The bake pans may be used over and over again with the same desirable results.

In the commercial preparation of baked goods, all ovens used to bake bread, cookies, crackers and other bake products, rely partially or wholly upon radiation to transfer heat to the dough mixture in the pan. In order to transfer heat to the dough mixture, the radiant heat must first strike the surface of the form or bake pan. The amount of radiant heat absorbed and reflected by the surface of the pan is generally dependent upon the composition and treatment of the form surface. Attempts have been made to improve the radiant heat absorption characteristics of baking pans and forms by oxidizing the surface of the metal or coating the form with an organic resin enamel coating prior to the application of the silicon resin coatings. These processes have been unsatisfactory for several reasons. They entail extra operations, which greatly increase the cost of production of the bake pans or forms, the adhesion of the silicone resin to the lower strata film is adversely affected and the release properties of the silicone resin coating is impaired.

It is the primary object of this invention to provide a silicone resin coating which has greatly improved radiant heat absorption properties, particularly in the infra red wave length range commonly used in commercial baking practice.

Another object is to provide a coating composition having high heat absorption characteristics comprising a silicone resin in admixture with a very small proportion of carbon, and which has substantially all of the desirable properties of the pure silicone resin without carbon.

Another object is to provide a coating of this type which is nontoxic, adhesive, chemical and heat resistant, and highly abrasion resistant to permit multiple baking cycles.

It is a further object to provide a high heat absorption silicone resin coating which is reproduceable both as to heat absorption and physical characteristics, the heat absorption being actually predeterminable.

It is still another object of the invention to produce a heat absorbent silicone coating for the release of baked food products to give the desired level of radiant heat absorption for browning the crust or surface of the baked product while retaining the excellent release properties of the silicone resin coating with respect to the baked goods.

These and other objects are achieved by incorporating from .05% to 13% pigment volume concentration of finely divided carbon in a silicone resin composition taken from the class consisting of polyorganosilanes and polyorganosiloxanes and mixtures thereof. Preferably, the carbon should be incorporated in the amount of 1% to 5% pigment volume concentration. We have found that a very thin coating of a silicone resin of this type containing finely divided carbon improves the radiant heat absorption on tinplate or aluminum pans in an amount of 50% to 200% over the same coating without finely divided carbon. It was highly unexpected that such a small quantity of carbon would produce such a large increase in absorptivity. The proportion of carbon is not nearly sufficient to "pigment" the resin, i.e. render it opaque. The carbon content is critical. If the upper limit of 13% by volume is exceeded, the desirable release properties of the silicone resin are adversely affected; and the silicone resin becomes brittle and abrades much faster than the unpigmented composition. Furthermore, the surface of the baked goods becomes contaminated. If the carbon content is reduced below .05% pigment volume concentration, the effect on radiant heat absorption is too small as to be of any practical value.

The carbon which is suitable for use in this invention may be one of a number of commercially available carbon black pigments including carbon black, lamp black and graphite. Low fixed-carbon materials are not as efficient in increasing radiant heat absorption; and consequently, these materials require higher pigment volume concentrations to be effective.

For the most effective results at a given pigment volume concentration, the pigment should contain over 95%, and preferably from 99% to 100% of fixed carbon. The lamp blacks and the large particle soft carbon blacks are preferred over graphite because these materials can be dispersed more readily and are commercially available in the desired particle size range. The relatively large particle size graphite produces dull films that cause transfer of the pigment upon contact which then transfers the graphite to the baked product The carbon black pigment suitable for use in this invention should have a particle size in the range from about one millimicron to about ten microns; furthermore, the carbon black pigment dimensions should not exceed the average film thickness of the resin-pigment admixture coating which generally does not exceed about five microns.

It has been found that if the particle size of the carbon pigment exceeds ten microns then the adhesion of the resin film to the metallic surface as well as the flexibility and release properties of the resin film are adversely affected.

Furthermore, if the carbon particles project from the surface of the resin coating, the release properties of the coating are impaired and the baked product will be contaminated. This is the reason why the graphite particles are not preferred. Although graphite will improve the heat absorption the graphite particles are relatively large in size as compared with carbon black and are plate-like in structure; consequently, the graphite particles have a tendency to float to the surface thus reducing the ability of the coating to release.

The silicone resins suitable for use in this invention include the polyorganosilanes, the polyorganosiloxanes, and mixtures thereof. These materials are well known in the art and are described in the literature. Reference is made to Clark Patent No. 2,606,837 and Rochow Patent No. 2,258,218 for a description of these resins and their method of preparation. Resins containing a predominance of polyorganosiloxanes are preferred in the practice of this invention. These compositions comprise essentially silicon atoms connected to each other by oxygen atoms through silicon-oxygen linkages and have on the average of 1.75 to 2.25 monovalent organic radicals attached through the carbon-silicon linkages to each silicon atom. The compositions are preferably of high molecular weight and are soluble in common hydrocarbon solvents, such as the aromatic hydrocarbons, including toluene and xylene. The preferred polyorganosiloxanes are those wherein the organic radicals are $CH_3$ and $C_6H_5$. Dimethyl siloxane and methylphenyl siloxane are the common commercial materials in this class.

The polyorganosilanes are similar in chemical structure to the polyorganosiloxanes above described, but the silicon atoms are connected directly to each other rather than through an atom of oxygen. Resins of both types are referred to herein simply as "silicones." They are colorless viscous liquids convertible upon application of heat to hard infusible polymers of great thermal and chemical stability.

The finely divided carbon pigment is preferably dispersed in a solution of the silicone resin in a volatile aromatic hydrocarbon solvent, such as xylene or toluene. This may be accomplished in a high speed ball mill. The dispersion admixture prepared may contain from five percent to fifty percent by weight of non-volatile constituents, namely carbon and resin. This dispersion admixture may be applied to a bake pan which has been previously cleaned in accordance with the conventional bake pan cleaning practices. The coating may be applied by spraying, brushing, dipping or rolling.

In the drawing, a metal bake pan 1 is shown in section with the coating applied to both the interior surface 2 and the exterior surface 3 of the bake pan 1. If any excess resin coating is present, it is drained from the pan and the pan is then dried. Preferably, the resin is cured at a temperature from 400° to 450° F. prior to baking bread or other baked goods therein. The length of time required to cure the resin may range from one to about eight hours. It will be understood that the time and temperature will vary depending upon whether a cure catalyst has been incorporated and upon the particular silicone resin used.

The thickness of the film coating on the bake pan surfaces should be in the preferred range from about 0.1 to about 0.4 mil (0.0001 to 0.0004 inch). Furthermore, it shall be noted that the film coating may be applied to the exterior surface 3 as well as the extremities of the bake pan 1, in order to enhance the corrosion resistance. The release property of the resin coating is generally attributed to the release film surface which is in contact with the baked product. The coating can be controlled by adjusting the proportion of the silicone resin compound in the solvent. The heavier deposits result from the more highly concentrated silicone solutions in the range of thirty-five percent to fifty percent by weight.

The radiant heat absorption of bake pans prepared in accordance with the invention will range from thirty percent to ninety percent. This value is expressed as the "emissivity" of the coating. Emissivity is the relative power of a surface, or the material composing a surface, to emit heat by radiation and is expressed as a fraction or the ratio between the quantity of heat radiated from the surface of a body and the quantity which would be radiated by a theoretically "black" body of the same dimensions and at the same temperatures. A theoretical black body absorbs all incident radiation at all wave lengths and reflects none. A perfect black body is nonexistent and for the purpose of comparison the standard presently used in these comparative data are corrected to ninety-five percent of "black body" conditions. The analog of emissivity is directed to substantially infrared heat absorption wherein the absorptivity of a surface is proportional to the emissivity.

Emissivity values set forth herein were determined with a low temperature radiation pyrometer. This unit is essentially a thermopile and is connected to a precision potentiometer. The test specimen is mounted in a holder which maintains its surface temperature at 250° F. The thermopile is placed about four inches from the surface of the test specimen and maintained at a temperature of 125° F. to minimize the effect of varying room temperature. Under these conditions the E.M.F. output of the thermopile is linear with respect to the radiation of the test specimen. Test values for a bright aluminum surface are 0.05 to 0.06 millivolt, which corresponds to an emissivity (absorptivity) of four percent. The emissivity of the same surface having a pure, i.e. non-pigmented, silicone coating thereon is about twenty-eight percent.

The emissivity values are, of course, dependent in part upon the thickness of the coating. Normally the emissivity increases with the coating thickness. The values given herein are corrected to a control thickness of 0.23 mil (0.00023 inch).

The following examples illustrate the practice of the invention.

*Example I*

| | Parts by weight |
|---|---|
| Dow-Corning R–671 silicone resin having 20% polyorganosiloxane resin content by weight in an aromatic solvent blend | 500 |
| Carbon black pigment "Molacco Black" | 4.5 |

The carbon black which is equivalent to about three percent pigment volume concentration was dispersed in the resin solution by grinding for twenty minutes in a high speed ball mill. After ball milling, a stable homogeneous dispersion was produced. It was sprayed on etched aluminum panels having an original emissivity of about four percent and cured at a temperature of about 425° F. for four hours. The film thickness was about 0.19 mil. The emissivity measurements were taken in accordance with the procedure outlined above, and the equivalent carbon-silicone resin coated aluminum panel had increased in emissivity to about fifty-one percent.

*Example II*

| | Parts by weight |
|---|---|
| Dow-Corning R–571 silicone resin having about a 20% polyorganosiloxane admixture resin content by weight in on aromatic solvent blend | 500 |
| Carbon black pigment "Witcoblak Hitone" | 15.6 |

The dispersion containing about ten percent pigment volume concentration was prepared from this composition in accordance with the procedure of Example I and applied to an identical aluminum panel in a thickness of 0.26 mil. After curing, the panel had an emissivity of 84.5%, or about twenty-one times that of the uncoated sample, said emissivity corrected.

*Example III*

Aluminum bread baking pans were coated using the dispersion of Example I and the coating was baked at 425° F. for four hours. The thickness of the coating was about 0.2 mil. The pans were used in a commercial bakery and went through 402 bake cycles before being removed from service for recoating. The performance proved to be comparable to the unpigmented silicone resin in all respects except, of course, the heat absorption was improved by about fifty percent. The baking time was correspondingly reduced. The crust in contact with the heat-absorptive pan was golden brown, resembling closely the color of the top exposed crust.

*Example IV*

Another test series was conducted wherein bright tinplate pans were coated with the composition of Example I except that the pigment volume concentration of the carbon black was increased to about 6.8%. The series was discontinued after 418 bakes without release failure. There was no contamination of the bread or interference with the release properties of the resin; and furthermore, the crust color was excellent.

It should be appreciated that to attain the desired radiant heat absorption, the exterior surface 3 of the bake pan must be coated with the hereindescribed compositions; and, in order to obtain the desired release properties, the interior surface 2 of the pan 1, in contact with the baked product, may be coated with the coating compositions herein described or with a conventional release resin. However, from the standpoint of convenience and cost, it is preferred that the coating composition described herein be applied to all surfaces of the baking pan in a single coating operation.

It has been found that upon using the coating compositions of this invention on several thousand test bake pans, the products baked in those pans had a more uniform darker crust color than was obtained with other pans not having the coating compositions described herein. Furthermore, the baked product having this darker crust color will be more readily released and prolong the useful "release life" of the coating compositions of this invention as contrasted with conventional silicone release coatings.

It will be apparent to those skilled in the art that various modifications may be made in the composition without departing from the spirit of our invention. It is, therefore, our intention not to limit the invention other than as necessitated by the scope of the appended claims.

What we claim as new and desire to secure by Letters Patent of the United States is:

1. A continuous uniform heat absorptive silicone bake surface release type film deposited on a metallic bake form for producing bake goods, said film consisting essentially of a polyorganosiloxane resin and about 0.5%–5% by volume of finely divided carbon black having a particle size in the millimicron range, said millimicron carbon black particles deposited substantially in contiguous relationship to said metallic bake form and said release silicone bake surface substantially free of said millimicron carbon black particles thereby preventing contamination of the bake goods.

2. A continuous uniform polymerized heat absorptive silicone bake surface release type film deposited on a metallic bake form for producing bake goods, said film consisting essentially of a polyorganosiloxane resin and about 0.5%–5% by volume of finely divided carbon black having a particle size in the millimicron range, said polymerized heat absorptive silicone release type film having a thickness in the range from about 0.0001 to 0.0004 inch, said millimicron carbon black particles deposited substantially in intermediate relationship to said metallic bake form and said release silicone bake surface substantially free of millimicron carbon black particles thereby preventing contamination of the bake goods.

3. The form of claim 2 having an emissivity of at least 50%.

4. The form of claim 2 wherein said metal is tinplate.

5. The form of claim 2 wherein said metal is aluminum.

6. The form of claim 2 wherein said metal is carbon steel.

7. The form of claim 2 wherein said metal is aluminum coated carbon steel.

8. The form of claim 2 in which both the external and internal surfaces are completely coated with said hard silicone film.

References Cited in the file of this patent

UNITED STATES PATENTS

| | | |
|---|---|---|
| 2,470,593 | Webb et al. | May 17, 1949 |
| 2,486,674 | Pedersen | Nov. 1, 1949 |
| 2,606,510 | Collings | Apr. 12, 1952 |
| 2,610,167 | Grotenhuis | Sept. 9, 1952 |
| 2,672,104 | Clark | Mar. 16, 1954 |
| 2,684,177 | Kennedy | July 20, 1954 |
| 2,703,768 | Hall | Mar. 8, 1955 |
| 2,711,399 | Smith-Johannsen | June 21, 1955 |
| 2,743,192 | White | Apr. 24, 1956 |
| 2,816,089 | Willis | Dec. 10, 1957 |
| 2,833,441 | Hedlund | May 6, 1958 |
| 2,884,388 | Hedlund | Apr. 28, 1959 |

FOREIGN PATENTS

| | | |
|---|---|---|
| 465,981 | Canada | June 20, 1950 |